US008414119B2

(12) United States Patent
Yeh

(10) Patent No.: US 8,414,119 B2
(45) Date of Patent: Apr. 9, 2013

(54) EYEGLASS FRAME ASSEMBLY ADAPTABLE TO LENSES OF DIFFERENT CURVATURES

(75) Inventor: Hsueh-Chu Yeh, Tainan (TW)

(73) Assignee: Day Sun Industrial Corp., Tainan (TW)

( * ) Notice: Subject to any disclaimer, the term of this patent is extended or adjusted under 35 U.S.C. 154(b) by 27 days.

(21) Appl. No.: 13/158,491

(22) Filed: Jun. 13, 2011

(65) Prior Publication Data

US 2012/0314182 A1 Dec. 13, 2012

(51) Int. Cl.
*G02C 9/00* (2006.01)

(52) U.S. Cl. ............................... 351/47; 351/57; 351/86

(58) Field of Classification Search .................... 351/47, 351/48, 57, 58, 83, 86, 103, 106, 41
See application file for complete search history.

(56) References Cited

U.S. PATENT DOCUMENTS 4,659,196 A * 4/1987 Gazeley .......................... 351/57
5,428,407 A * 6/1995 Sheffield ......................... 351/58
5,467,148 A * 11/1995 Conway .......................... 351/85
6,517,202 B2 * 2/2003 Huang .......................... 351/103
6,550,912 B2 * 4/2003 Vitaloni .......................... 351/47
6,749,299 B1 * 6/2004 Hsu ................................ 351/62
7,029,114 B2 * 4/2006 Smith ............................ 351/47
7,055,951 B2 * 6/2006 Canavan et al. ................ 351/57
7,192,134 B2 * 3/2007 Teng .............................. 351/47
7,219,992 B1 * 5/2007 Wu ................................ 351/86
7,219,993 B1 * 5/2007 Chiou .......................... 351/103

* cited by examiner

*Primary Examiner* — Hung Dang
(74) *Attorney, Agent, or Firm* — Alan Kamrath; Kamrath IP Lawfirm, P.A.

(57) ABSTRACT

An eyeglass frame assembly adaptable to lenses of different curvatures for holding replaceable optical or sunglass lenses includes an inner frame and an eyeglass frame. The inner frame has a rear periphery and laterals thereof formed as an abutting surface corresponding to a forward receiving area and two lateral linking rooms formed on the eyeglass frame. The inner frame preinstalled with the optical lenses or the sunglass lenses is easily assembled to the eyeglass frame by inserting two laterals of the inner frame into the lateral linking rooms of the eyeglass frame and buckling a middle portion of the inner frame to a corresponding portion of the eyeglass frame, to allow the abutting surface of the inner frame to abut against the matching receiving area of the eyeglass frame. With this design, the inner frame attached to the eyeglass frame can be easily replaced as needed.

3 Claims, 12 Drawing Sheets

EYEGLASS FRAME ASSEMBLY ADAPTABLE TO LENSES OF DIFFERENT CURVATURES

BACKGROUND OF THE INVENTION

1. Technical Field

The present invention relates to eyeglass frames and, more particularly, to an eyeglass frame assembly configured to alternatively accommodate lenses of different curvatures and is designed so that an inner frame preinstalled with optical lenses or sunglass lenses can be buckled to or unbuckled from an eyeglass frame through a fast and convenient operation.

2. Description of Related Art

Allowing for replacement of lenses by users, currently many glasses are designed with lens fast installing/removing mechanisms so that users can easily and safely replace lenses by themselves in order to satisfy their different needs without the concern of breaking the lenses or the eyeglass frames during operation.

The conventional installing/removing mechanisms for lenses mostly involve directly fixing lenses of a predetermined function to an eyeglass frame having its periphery fittingly holding the lenses or inserting optical lenses for correcting vision to an auxiliary frame and then bulking the auxiliary frame to an inner side of an eyeglass frame that has been combined with a sunglass lens, thereby providing the required sunglass lenses or optical lenses to the user.

However, for performing the foregoing approach and thereby replacing lenses, the user has to use his/her fingers to hold the lenses to be installed and pull the lenses to be removed, so the lenses are likely to be smudged with fingerprints, and need additional cleaning. Furthermore, the foregoing auxiliary frame carrying optical lenses cannot be fixed to and positioned on an eyeglass frame unless the eyeglass frame is provided at its inner side with corresponding clamping devices. This poses a problem that such an auxiliary frame carrying optical lenses has to be configured according to the eyeglass frame it is to be attached to, and different eyeglass frames may require different configurations of auxiliary frames, making the conventional approach inconvenient.

SUMMARY OF THE INVENTION

The present invention therefore provides improvement to the conventional eyeglass frame that allows replacement of lenses with the attempt to enable an inner frame combined with optical lenses or sunglass lenses to be conveniently and quickly attached to or detached from an eyeglass frame.

A first objective of the present invention is to provide an eyeglass frame assembly for holding replaceable optical lenses or sunglass lenses. The eyeglass frame assembly includes an inner frame and an eyeglass frame. The inner frame has a variable curvature to fit the optical lenses or sunglass lenses preinstalled thereon, thereby providing the lenses of desired functions. The inner frame has its rear periphery and laterals formed as an abutting surface corresponding to a forward receiving area and two lateral linking rooms formed on the eyeglass frame. Thus, the inner frame installed therein with optical lenses or sunglass lenses can be assembled to the eyeglass frame by inserting two laterals of the inner frame into the lateral linking rooms of the eyeglass frame and buckling a middle portion of the inner frame to a corresponding portion of the eyeglass frame, thereby allowing the abutting surface of the inner frame to abut against the matching receiving area of the eyeglass frame. With this design, the inner frame attached to the eyeglass frame can be easily replaced as needed.

A second objective of the present invention is to provide an eyeglass frame assembly featuring the combination between its inner frame preinstalled with optical lenses or sunglass lenses and its eyeglass frame. The eyeglass frame has its front side formed as the receiving area for fittingly receiving an abutting surface at a rear periphery of the inner frame, and each of the linking rooms of the eyeglass frame includes a notch at its upper part and a recess formed next to the receiving area and below the notch for receiving each of two protrusions extended laterally from the inner frame. The inner frame has wings formed below the protrusions and to be fitted in the recesses. The eyeglass frame has a middle portion thereof formed as a supporting portion. The supporting portion is laterally provided with two through holes each engaging with a raised portion extended from the inner frame. The eyeglass frame and the inner frame preinstalled with lenses of a predetermined function are able to be assembled stably or disassembled through a fast and convenient operation.

A third objective of the present invention is to provide an eyeglass frame assembly, which has the inner frame for being installed with the optical lenses or the sunglass lenses and assembled to the eyeglass frame. The inner frame is formed as a unity or is formed as two independent parts corresponding to left and right eyes, respectively.

A fourth objective of the present invention is to provide an eyeglass frame assembly featuring the combination between its inner frame formed as two independent parts and preinstalled with optical lenses or sunglass lenses and its eyeglass frame. The eyeglass frame has its lateral sides formed as receiving areas for fittingly receiving abutting surfaces at rear peripheries of the inner frame. A backward extending groove is formed at an upper part of each of two lateral sides of the receiving area of the eyeglass frame and communicated with a through hole formed inside a leg-connecting segment. Thus, a bent-end connecting portion extended from each of the independent parts of the inner frame is guided by the groove of the eyeglass frame and engaged with the through hole. Two recesses formed at a lower periphery of a middle section of the eyeglass frame each receive a raised portion formed at an inner side of one of the independent parts of the inner frame, whereby the eyeglass frame and the inner frame composed of the two independent parts and preinstalled with lenses of a predetermined function are able to be assembled stably or disassembled through a fast and convenient operation.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
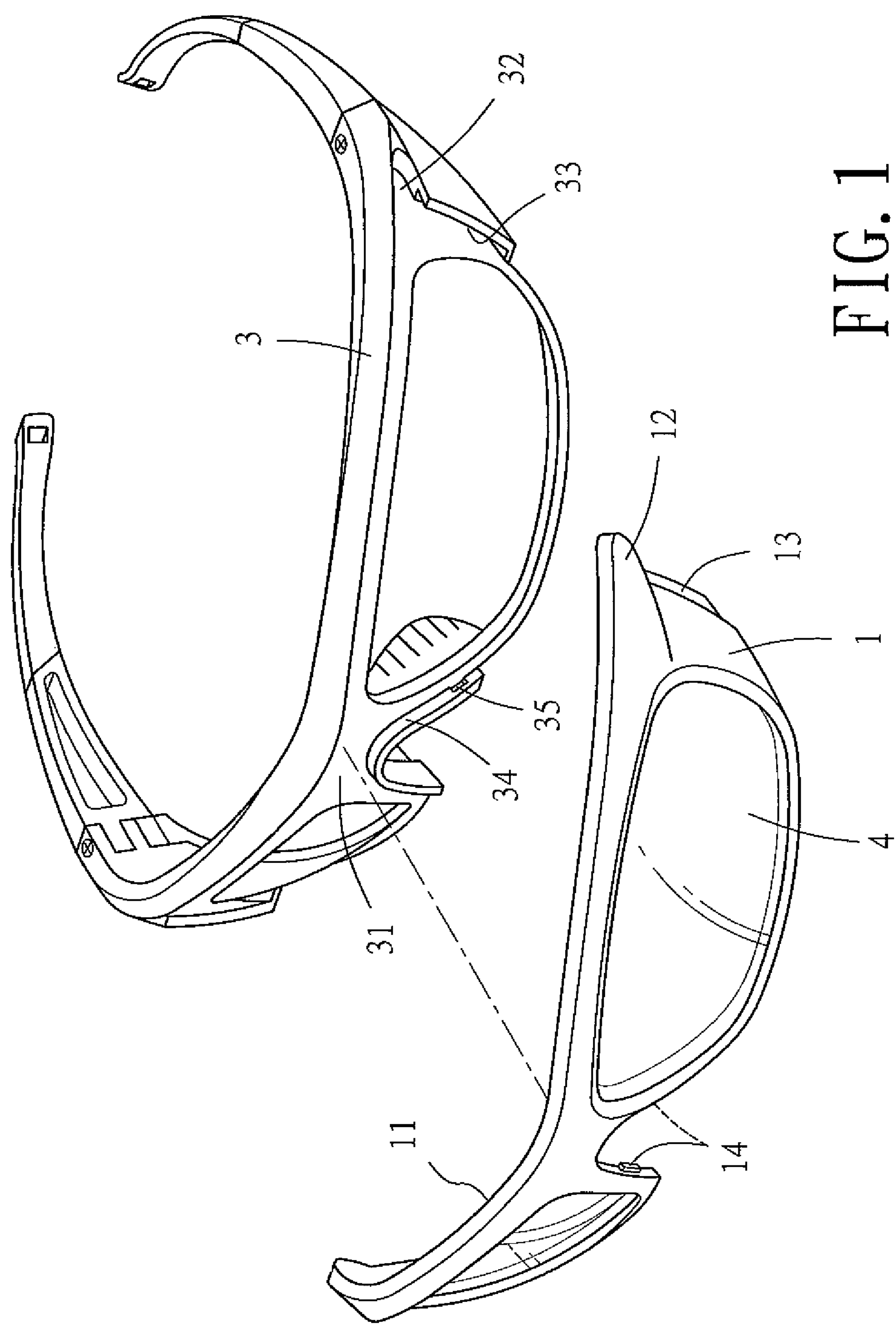
FIG. 1 is a disassembled view of an eyeglass frame and an inner frame preinstalled with optical lenses according to a first embodiment of the present invention.
Figure 4:
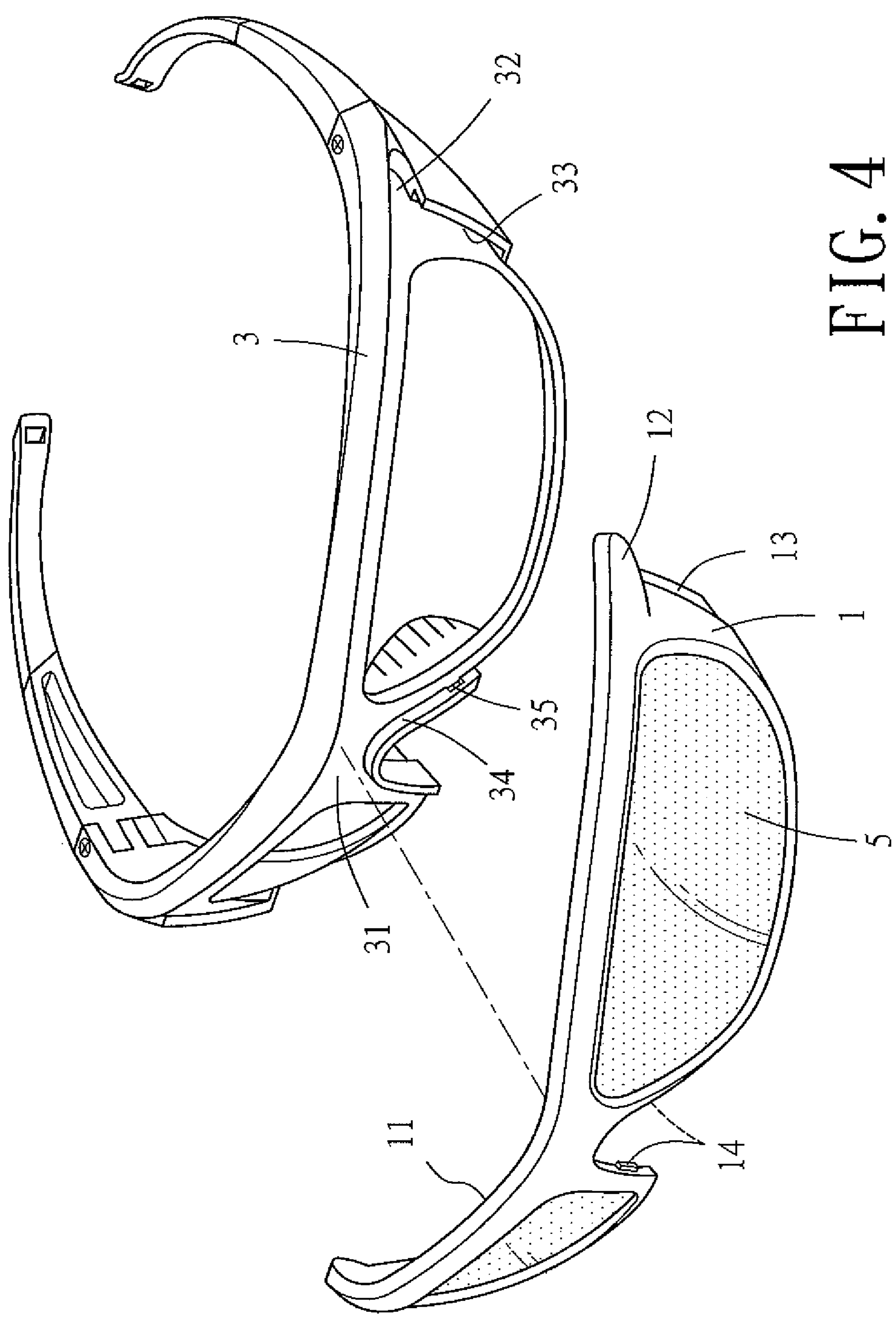
FIG. 4 is a disassembled view of the eyeglass frame and the inner frame preinstalled with sunglass lenses according to the first embodiment of the present invention.

According to a first embodiment of the present invention, an eyeglass frame assembly adaptable to lenses of different curvatures (as shown in FIGS. 1 and 4) allows optical lenses (4) or sunglass lenses (5) to be detached or attached to an eyeglass frame (3) thereof [FIG. 1 showing the eyeglass frame with the optical lenses and FIG. 4 showing the eyeglass frame with the sunglass lenses] and comprises an inner frame (1) and the eyeglass frame (3).

The inner frame (1) has a variable curvature to fit the optical lenses (4) or sunglass lenses (5) installed thereon, thereby providing the lenses of desired functions. [e.g. in FIG. 1 being installed with the optical lenses (4), and in FIG. 4 being installed with the sunglass lenses (5)]. The inner frame (1) has its rear periphery formed as an abutting surface (11) and comprises two protrusions (12) extended at two laterals thereof. Two wings (13) are formed at the laterals of the inner frame (1) below the protrusions (12), and a pair of facing raised portions (14) is formed at in inner side of the inner frame (1).

The eyeglass frame (3) is a frame body configured to be assembled with the inner frame (1) preinstalled with the optical lenses (4) or the sunglass lenses (5). The eyeglass frame (3) has its front side formed as a receiving area (31) flanked by two lateral linking rooms. Each of the linking rooms has a notch (32) at its upper part, and a recess (33) next to the receiving area (31) and below the corresponding notch (32). The eyeglass frame (3) has its middle part formed with a supporting portion (34), on which two facing through holes (35) are formed.

Figure 2:
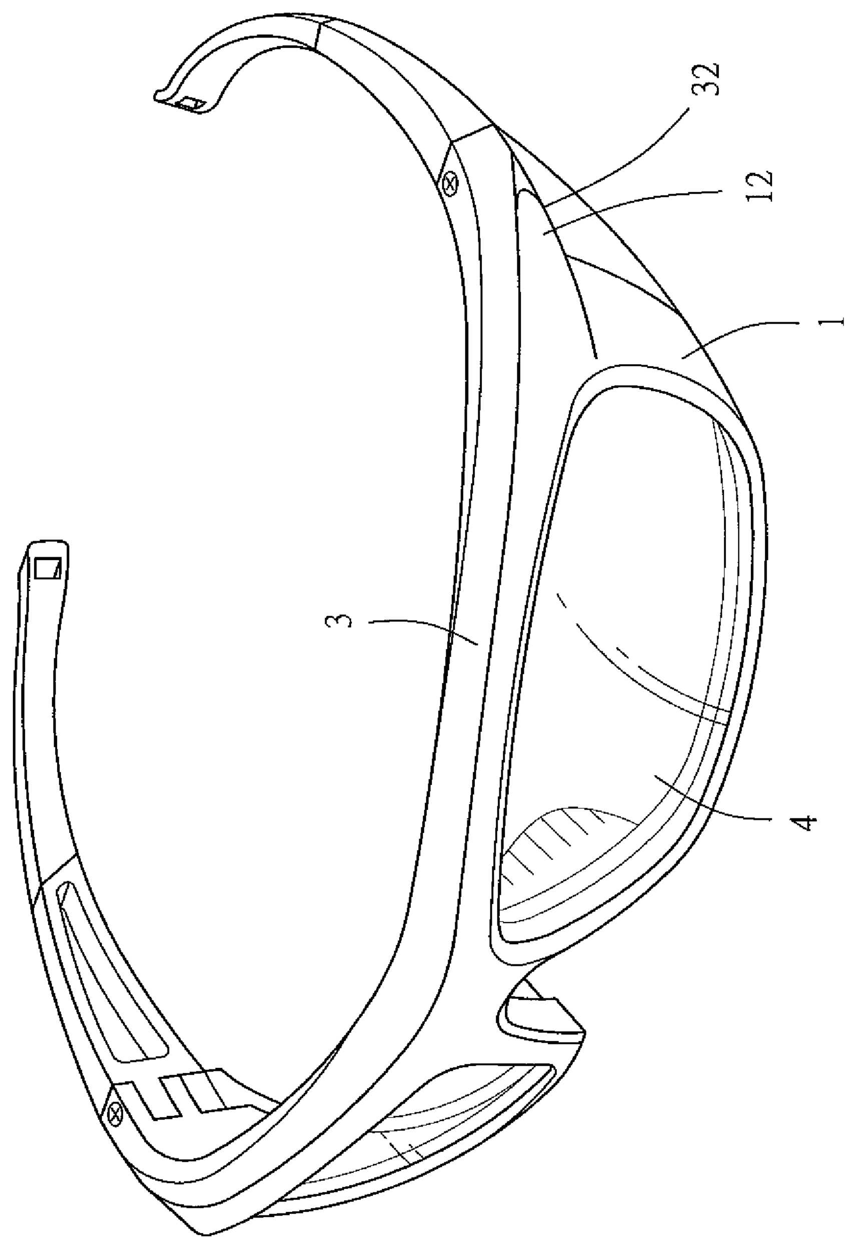
FIG. 2 is an assembled view of the eyeglass frame and the inner frame preinstalled with the optical lenses according to the first embodiment of the present invention.
Figure 5:
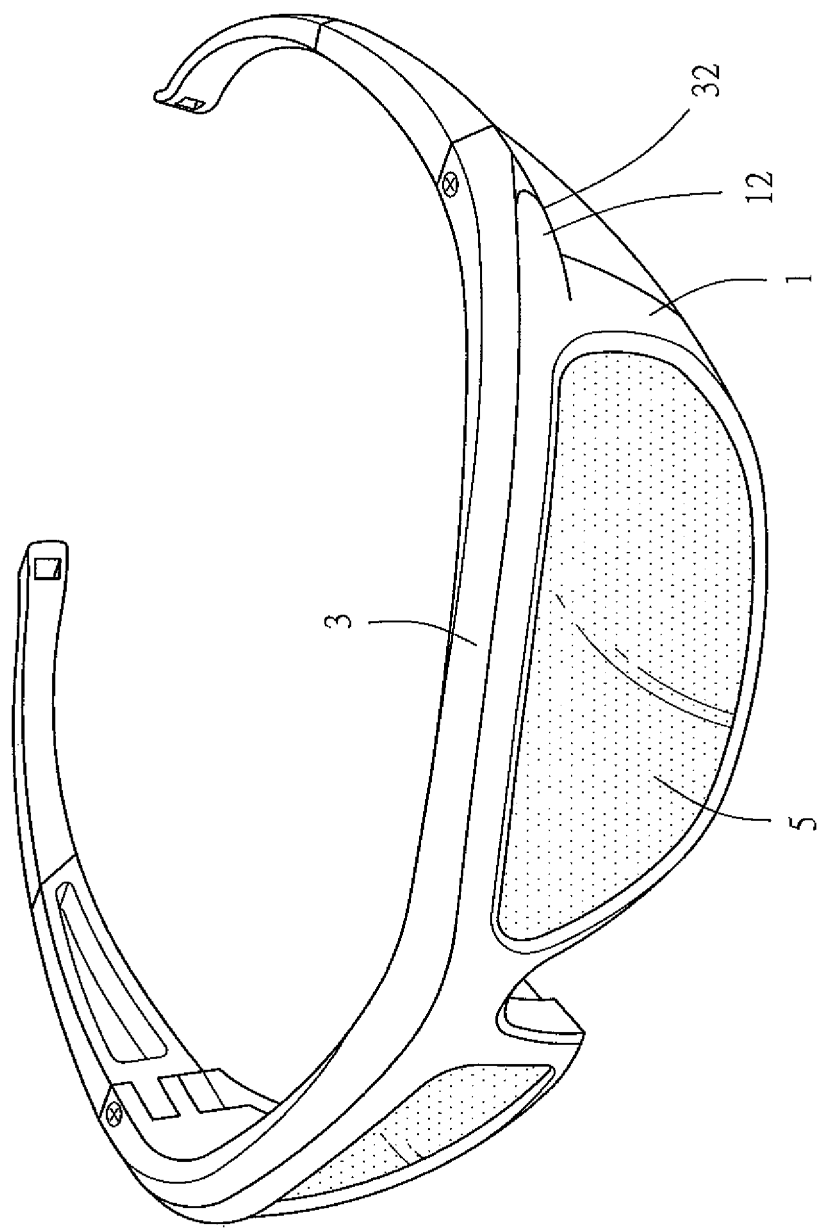
FIG. 5 is an assembled view of the eyeglass frame and the inner frame preinstalled with the sunglass lenses according to the first embodiment of the present invention.

For assembling the inner frame (1) preinstalled with the optical lenses (4) or the sunglass lenses (5) to the eyeglass frame (3) [i.e. in FIGS. 1 and 2, assembling the inner frame preinstalled with the optical lenses to the eyeglass frame, and in FIGS. 4 and 5, assembling the inner frame preinstalled with the sunglass lens to the eyeglass frame], the protrusions (12) extended from the two laterals of the inner frame (1) are inserted into the corresponding notches (32) on the eyeglass frame (3), so that the wings (13) below the protrusions (12) can be received in the recesses (33) of the eyeglass frame (3).

Figure 3:
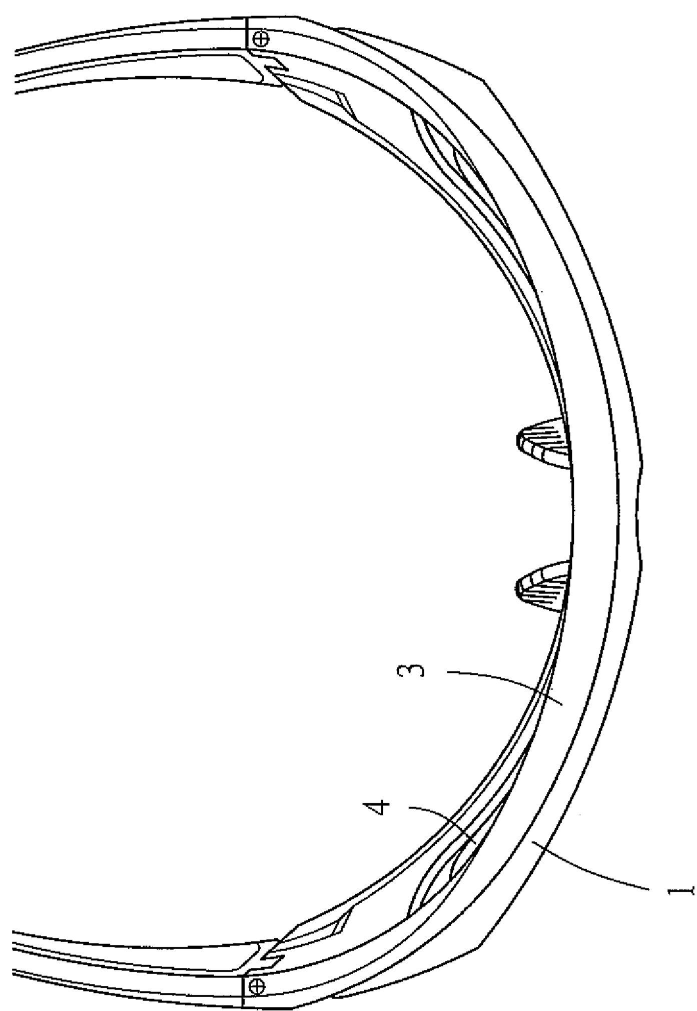
FIG. 3 is a top view of FIG. 2.
Figure 6:
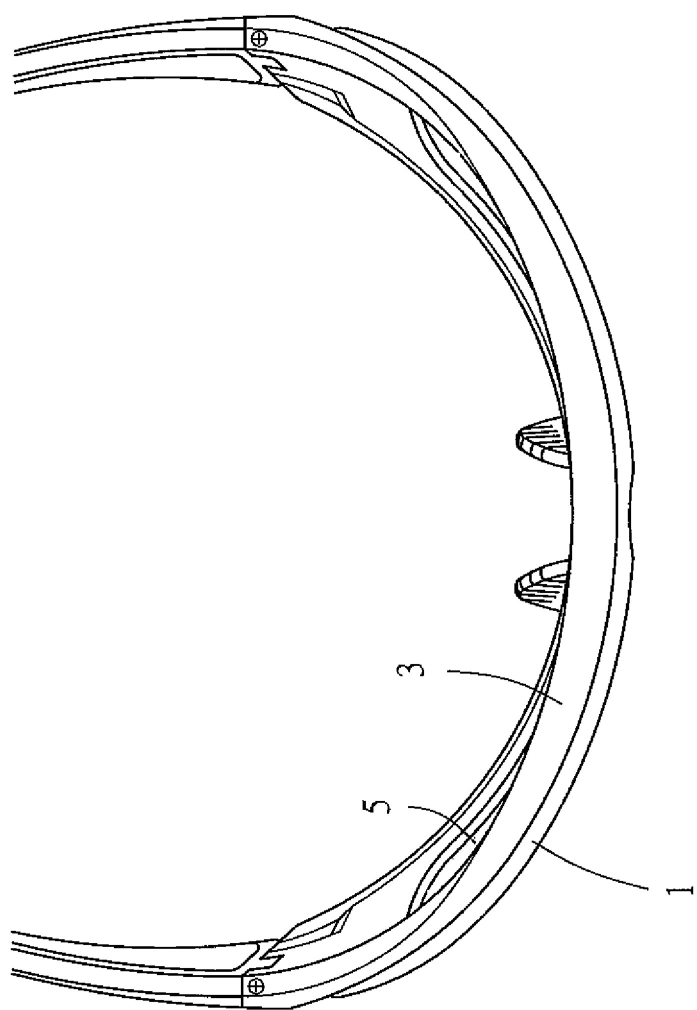
FIG. 6 is a top view of FIG. 5.

Then, the raised portions (14) formed on the inner frame (1) are engaged with the through holes (35) formed on the supporting portion (34) of the eyeglass frame (3), thereby the abutting surface (11) at the rear surface of the inner frame (1) abuts against and fittingly received in the receiving area (31) at the front surface of the eyeglass frame (3). Thus, the eyeglass frame (3) and the inner frame (1) preinstalled with lenses of desired functions [e.g. the optical lenses in FIGS. 1 and 2, and the sunglass lenses in FIGS. 4 and 5] can be assembled stably [as shown in FIGS. 3 and 6] or disassembled through a fast and convenient operation. With this design, the inner frame (1) attached to the eyeglass frame (3) can be easily replaced as needed.

Figure 7:
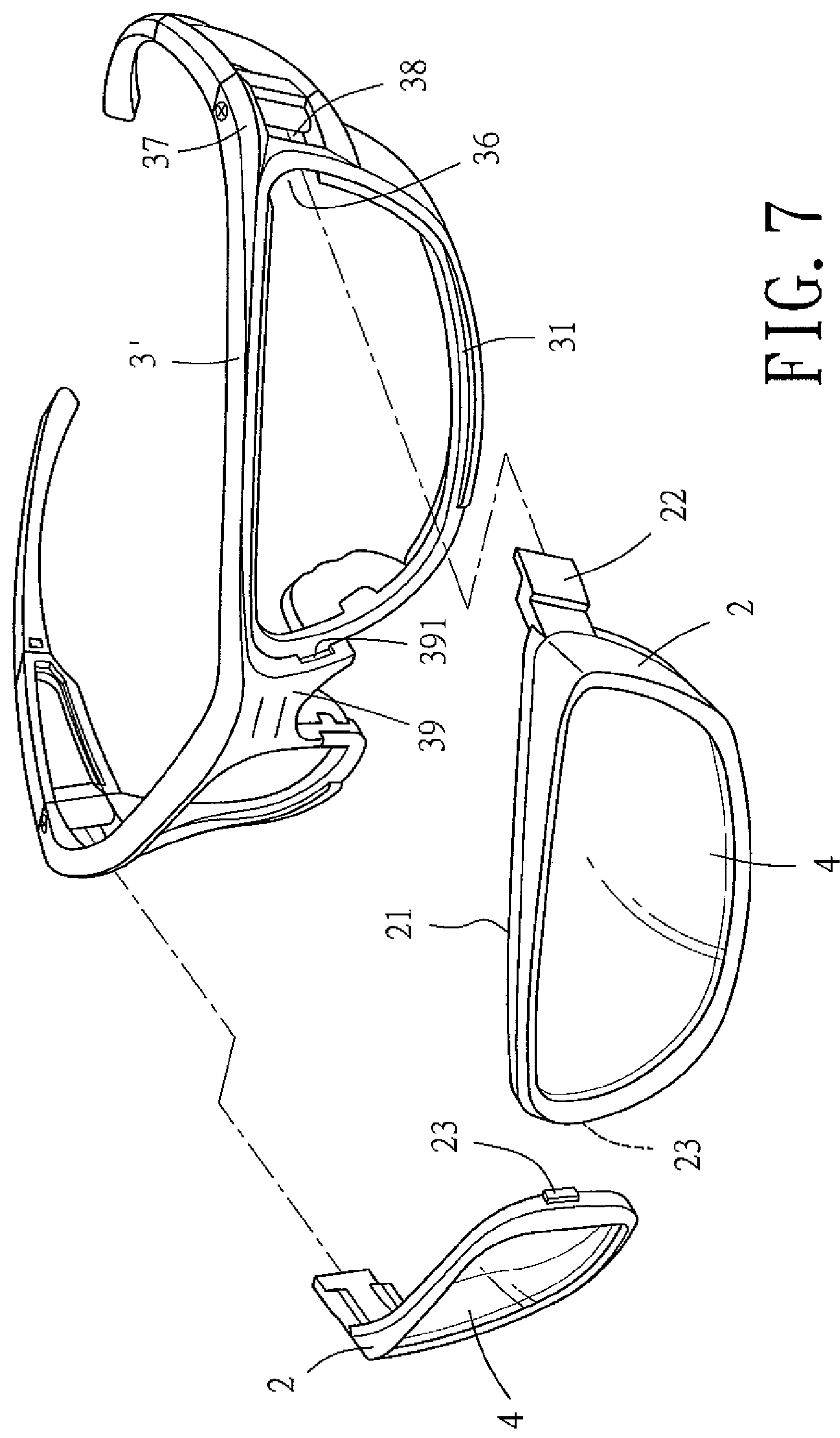
FIG. 7 is a disassembled view of an eyeglass frame and an inner frame preinstalled with optical lenses according to a second embodiment of the present invention.
Figure 10:
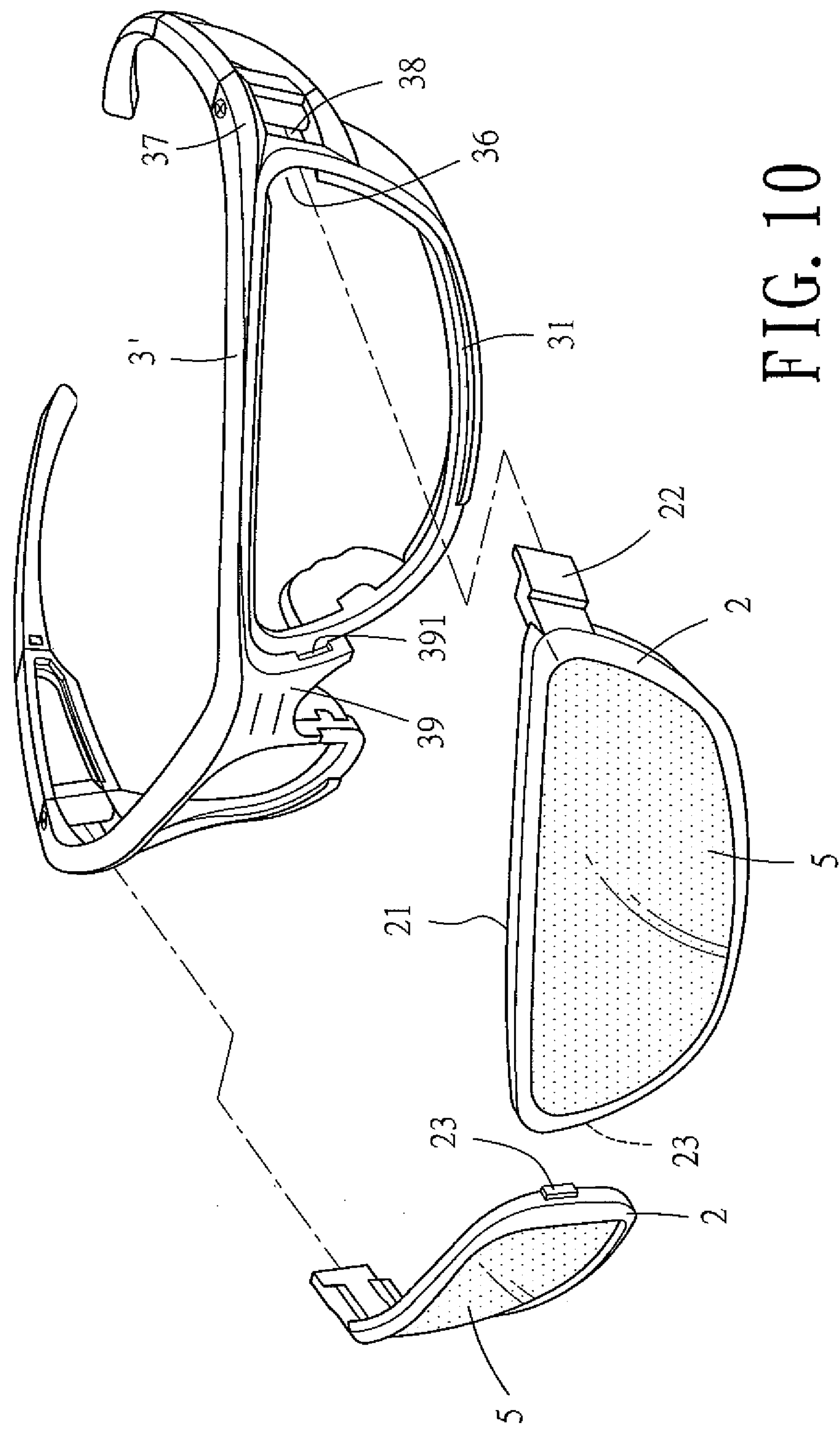
FIG. 10 is a disassembled view of the eyeglass frame and the inner frame preinstalled with sunglass lenses according to the second embodiment of the present invention.

According to a second embodiment of the present invention, an eyeglass frame assembly adaptable to lenses of different curvatures (as shown in FIGS. 7 and 10) allows optical lenses (4) or sunglass lenses (5) to be detached or attached to an eyeglass frame (3') [FIG. 7 showing the eyeglass frame with the optical lenses and FIG. 10 showing the eyeglass frame with the sunglass lenses] and comprises an inner frame (2) formed as two independent parts and the eyeglass frame (3').

The two independent parts of the inner frame (2) have variable curvature to provide the lenses of desired functions. [e.g. in FIG. 7 being installed with the optical lenses (4), and in FIG. 10 being installed with the sunglass lenses (5)]. Each of the two independent parts of the inner frame (2) has its rear periphery formed as an abutting surface (21) while comprising a bent-end connecting portion (22) extended from an outer lateral thereof and a raised portion (23) formed on an inner lateral thereof.

The eyeglass frame (3') is a frame body configured to be assembled with the two independent parts of the inner frame (2) preinstalled with the optical lenses (4) or the sunglass lenses (5). The eyeglass frame (3') has receiving areas (31) at two sides thereof. A groove (36) is formed at an outer lateral of each of the receiving areas (31) of the eyeglass frame (3') and is communicated with a through hole (38) formed on a leg-connecting segment (37). Two recesses (391) are formed at a lower periphery of a middle section (39) of the eyeglass frame (3).

Figure 8:
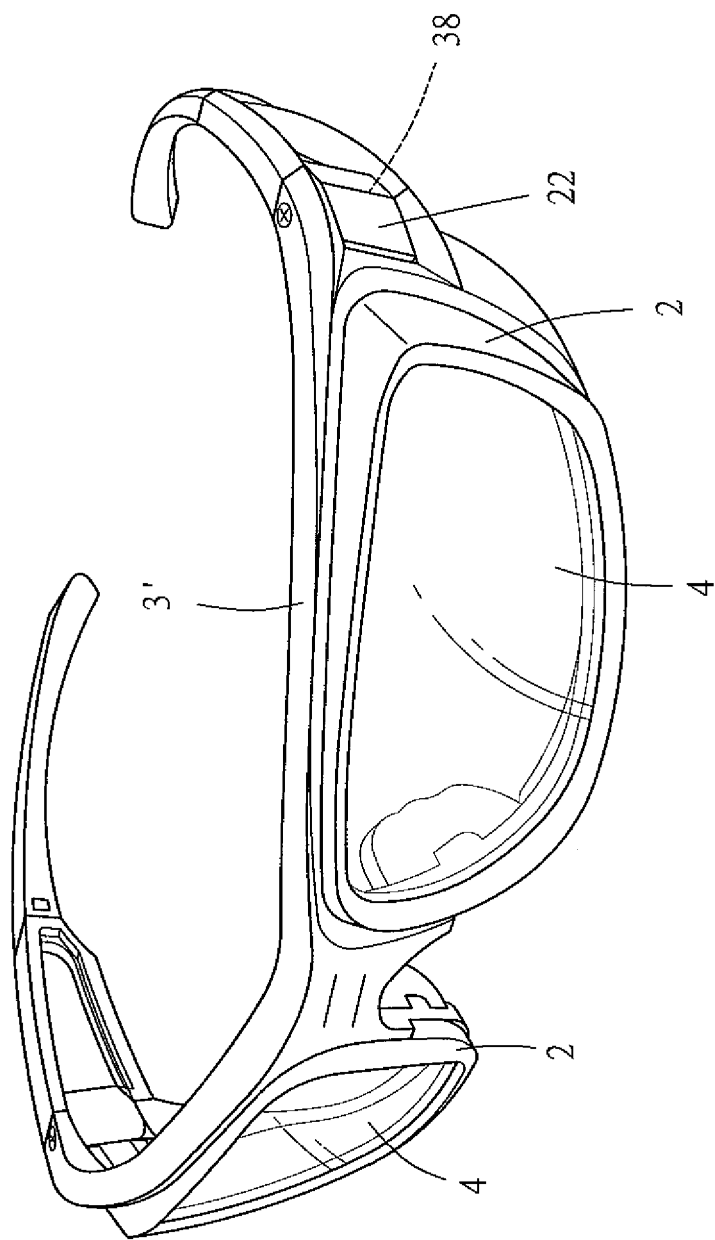
FIG. 8 is an assembled view the eyeglass frame and the inner frame preinstalled with the optical lenses according to the second embodiment of the present invention.
Figure 11:
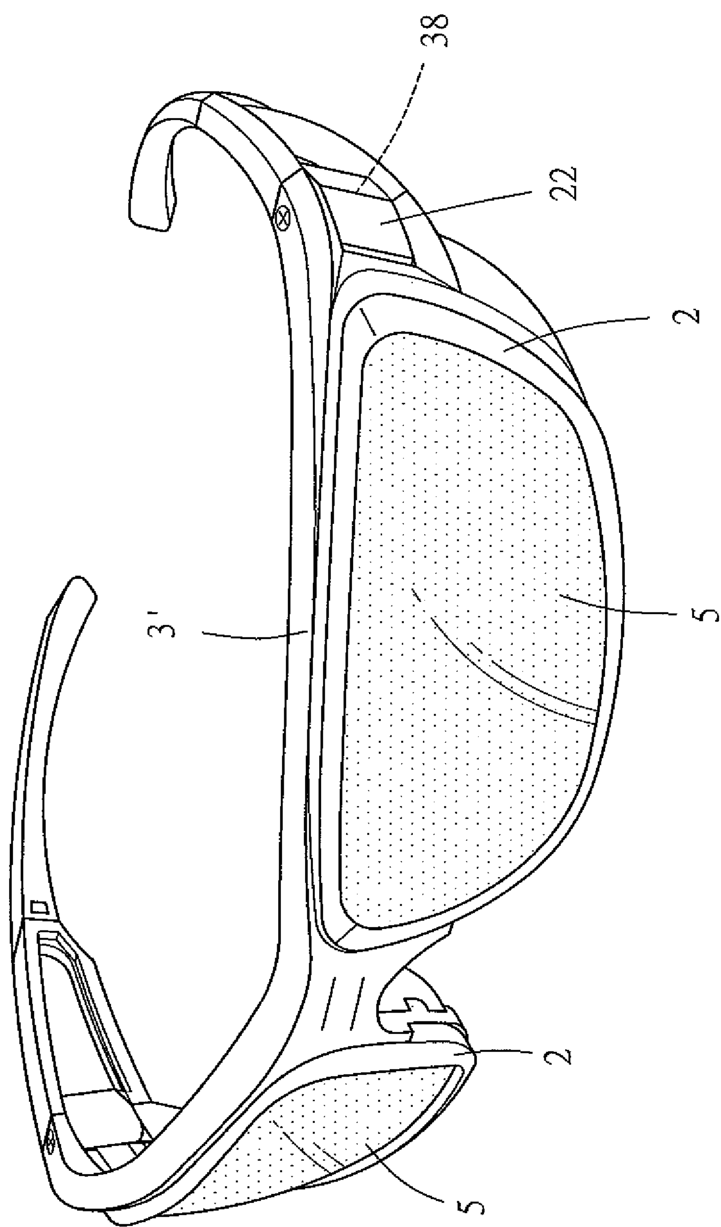
FIG. 11 is an assembled view of the eyeglass frame and the inner frame preinstalled with the sunglass lenses according to the second embodiment of the present invention.

For assembling the two independent parts of the inner frame (2) preinstalled with the optical lenses (4) or the sunglass lenses (5) to the eyeglass frame (3') [i.e. in FIGS. 7 and 8, assembling the inner frame preinstalled with the optical lenses to the eyeglass frame, and in FIGS. 10 and 11, assembling the inner frame preinstalled with the sunglass lens to the eyeglass frame], the bent-end connecting portions (22) extended from the two independent parts of the inner frame (2) are guided by the grooves (36) of the eyeglass frame (3') to be engaged with the through holes (38). Then, the raised portions (23) on the inner laterals of the two dependent parts of the inner frame (2) are engaged with the recesses (391) at the middle section (39) of the eyeglass frame (3').

Figure 9:
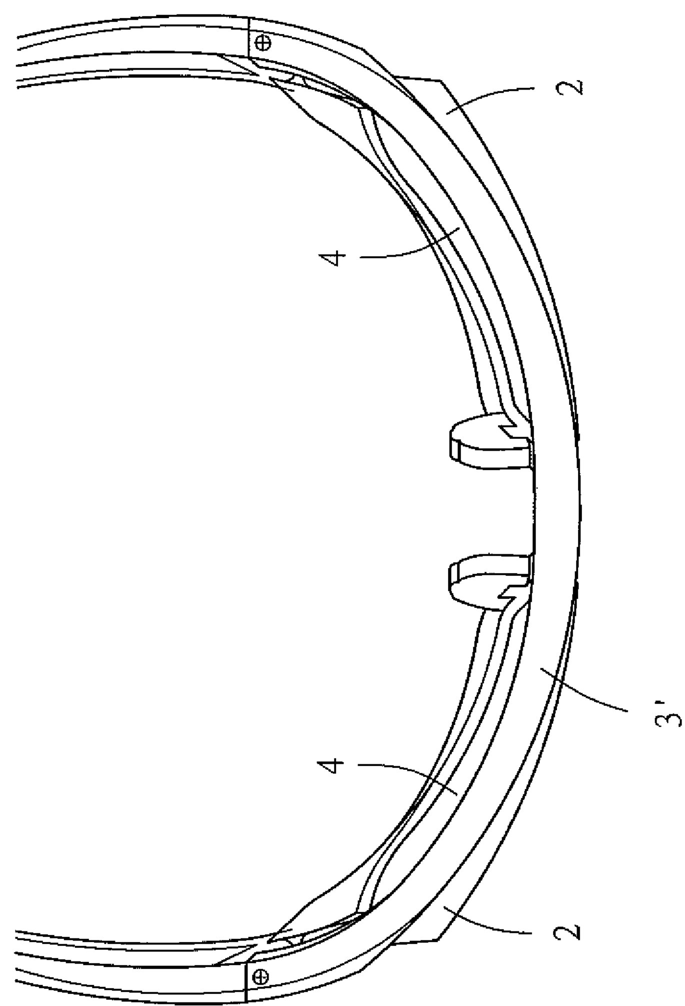
FIG. 9 is a top view of FIG. 8.
Figure 12:
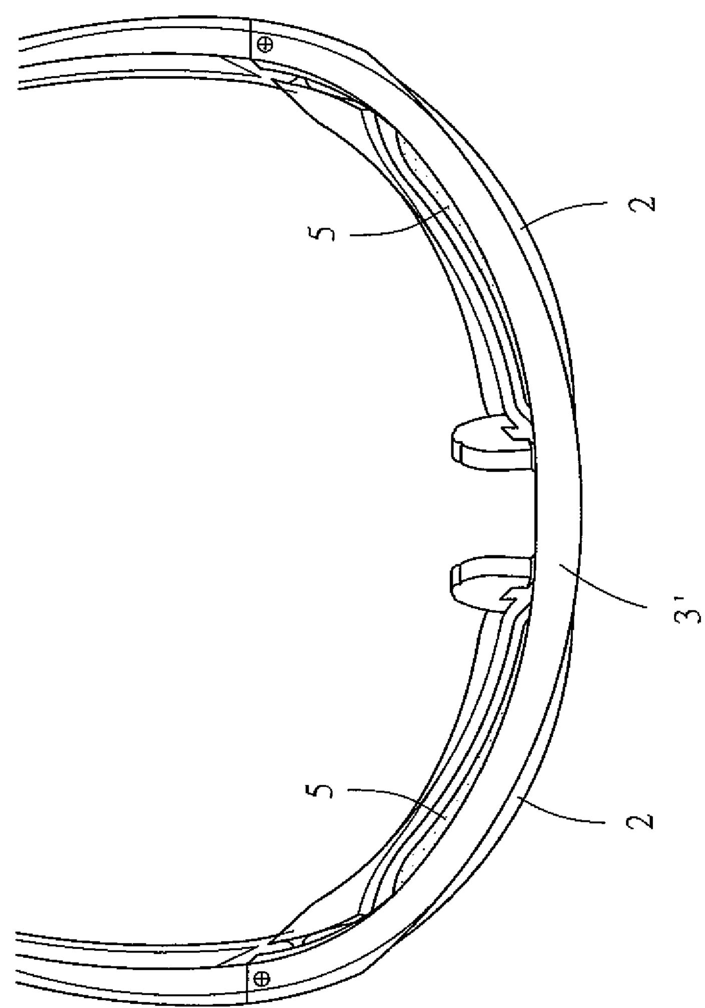
FIG. 12 is a top view of FIG. 11.

Thus, the eyeglass frame (3') and the two independent parts of the inner frame (2) preinstalled with lenses of desired functions [e.g. the optical lenses in FIGS. 7 and 8, and the sunglass lenses in FIGS. 10 and 11] can be assembled stably [as shown in FIGS. 9 and 12] or disassembled through a fast and convenient operation. With this design, the inner frame (2) attached to the eyeglass frame (3') can be easily replaced as needed.

What is claimed is:

1. An eyeglass frame assembly adaptable for holding replaceable optical lenses or sunglass lenses of different curvatures, comprising an inner frame and an eyeglass frame; with the inner frame having a variable curvature to fit the replaceable optical lenses or sunglass lenses installed thereon, with the inner frame having a rear periphery and two laterals thereof formed as an abutting surface corresponding to a forward receiving area and two lateral linking rooms formed on the eyeglass frame, wherein the inner frame preinstalled with the replaceable optical lenses or sunglass lenses is assembled to the eyeglass frame by inserting the two laterals of the inner frame into the two lateral linking rooms of the eyeglass frame and buckling a middle portion of the inner frame to a corresponding portion of the eyeglass frame, wherein the abutting surface of the inner frame abuts against the forward receiving area of the eyeglass frame, wherein the inner frame attached to the eyeglass frame is replaced as needed, wherein the eyeglass frame has a front side formed as the forward receiving area for fittingly receiving the abutting surface at the rear periphery of the inner frame and each of the two lateral linking rooms of the eyeglass frame includes a notch at an upper part and a recess formed next to the forward receiving area and below the notch for receiving each of two protrusions extended laterally from the inner frame, with the inner frame having wings formed below the two protrusions and fitted in the recesses, with the eyeglass frame having a middle portion thereof formed as a supporting portion, wherein the supporting portion is laterally provided with two through holes each engaging with a raised portion extended from the inner frame, wherein the eyeglass frame and the inner frame preinstalled with the replaceable optical lenses or sunglasses lenses are assembled stably or disassembled through a fast and convenient operation.

2. An eyeglass frame assembly adaptable for holding replaceable optical lenses or sunglass lenses of different curvatures, comprising an inner frame and an eyeglass frame; with the inner frame having a variable curvature to fit the replaceable optical lenses or sunglass lenses installed thereon, with the inner frame having a rear periphery and two laterals thereof formed as an abutting surface corresponding to a forward receiving area and two lateral linking rooms formed on the eyeglass frame, wherein the inner frame preinstalled with the replaceable optical lenses or sunglass lenses is assembled to the eyeglass frame by inserting the two laterals of the inner frame into the two lateral linking rooms of the eyeglass frame and buckling a middle portion of the inner frame to a corresponding portion of the eyeglass frame, wherein the abutting surface of the inner frame abuts against the forward receiving area of the eyeglass frame, wherein the inner frame attached to the eyeglass frame is replaced as needed, wherein the inner frame installed with the replaceable optical lenses or the sunglass lenses and assembled to the eyeglass frame is formed as a unity part corresponding to left and right eyes, respectively.

3. An eyeglass frame assembly adaptable for holding replaceable optical lenses or sunglass lenses of different curvatures, comprising an inner frame and an eyeglass frame; with the inner frame having a variable curvature to fit the replaceable optical lenses or sunglass lenses installed thereon, wherein the eyeglass frame has two lateral sides formed as receiving areas for fittingly receiving abutting surfaces at rear peripheries of the inner frame, wherein a backward extending groove is formed at an upper part of each of the two lateral sides of the receiving areas of the eyeglass frame and communicated with a through hole formed inside a leg-connecting segment, wherein the inner frame installed with the replaceable optical lenses or the sunglass lenses and assembled to the eyeglass frame is formed as two independent parts corresponding to left and right eyes, respectively, wherein a bent-end connecting portion extended from each of the independent parts of the inner frame is guided by the backward extending groove of the eyeglass frame and engaged with the through hole, with two recesses being formed at a lower periphery of a middle section of the eyeglass frame each receiving a raised portion formed at an inner side of one of the two independent parts of the inner frame, wherein the eyeglass frame and the inner frame composed of the two independent parts and preinstalled with the replaceable optical lenses or the sunglass lenses are assembled stably or disassembled through a fast and convenient operation.

* * * * *